United States Patent
Uffenkamp et al.

(10) Patent No.: US 6,915,228 B2
(45) Date of Patent: Jul. 5, 2005

(54) METHOD AND DEVICE FOR CALIBRATING AN IMAGE SENSOR SYSTEM IN A MOTOR VEHICLE

(75) Inventors: Volker Uffenkamp, Ludwigsburg (DE); Steffen Abraham, Hildesheim (DE); Andreas Schmack, Stutensee (DE); Omar Alaa El-Din, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/676,155

(22) Filed: Oct. 1, 2003

(65) Prior Publication Data
US 2004/0133376 A1 Jul. 8, 2004

(30) Foreign Application Priority Data
Oct. 2, 2002 (DE) .......................................... 102 46 067

(51) Int. Cl.[7] .............................. G06F 19/00; G06F 7/70; H04N 7/18
(52) U.S. Cl. ................................. 702/94; 348/47; 701/1; 702/104
(58) Field of Search .......................... 702/93, 95, 104, 702/117; 701/1, 23, 26, 28, 200, 300, 301; 348/47, 114, 117, 219.1, 349; 396/50

(56) References Cited

U.S. PATENT DOCUMENTS

| 5,473,364 A | * | 12/1995 | Burt | 348/47 |
| 5,559,695 A | * | 9/1996 | Daily | 701/1 |
| 6,778,928 B2 | * | 8/2004 | Stiller | 702/104 |

FOREIGN PATENT DOCUMENTS

EP    1 120 746    8/2001

* cited by examiner

Primary Examiner—Michael Nghiem
Assistant Examiner—John Le
(74) Attorney, Agent, or Firm—Kenyon & Kenyon

(57) ABSTRACT

A method and a device for calibrating at least one image sensor system, which is located at (on and/or in and/or on top of) a motor vehicle, by the use of at least one calibrating object, for the calibration, and for determining the alignment of the at least one image sensor system with respect to the geometric travel axis of the motor vehicle.

28 Claims, 7 Drawing Sheets

METHOD AND DEVICE FOR CALIBRATING AN IMAGE SENSOR SYSTEM IN A MOTOR VEHICLE

FIELD OF THE INVENTION

The present invention relates to a method and a device for calibrating at least one image sensor system which is located on and/or in and/or on top of a motor vehicle, by the use of at least one calibrating object.

BACKGROUND INFORMATION

In motor vehicles, one thinks of the use of image sensor systems for recording the vehicle environment. In particular, the use of image sensor systems in driver assistance systems is planned. For example, image sensor systems may be used for the automatic regulation of the distance of the motor vehicle from a vehicle traveling ahead.

To enlarge the image recording range, the use of several image sensor systems in the motor vehicle is planned, their recording ranges being able at least partially to overlap. In particular, the use of stereo cameras is provided that are made up of two image sensor systems, which photograph (take) essentially the same scene.

Methods and devices are known for calibrating image sensor systems in motor vehicles using a calibrating object.

For example, a non-prepublished German patent application number 10229336.8 (filed Jun. 29, 2002), discusses a device and a method for calibrating an image sensor system using a calibrating object and a position reference sensor.

European Patent reference EP 1 120 746 refers to a method for calibrating an image sensor system in a motor vehicle using a calibrating object. In this context, the calibrating object is connected to the motor vehicle and aligned with respect to the motor vehicle via a mechanical adjusting device. In this context, the calibration is performed with respect to the longitudinal axis of the motor vehicle. The longitudinal axis may be projected by symmetrical features of the motor vehicle, especially the vehicle body. On account of manufacturing tolerances, this longitudinal axis may not jibe with the geometrical travel axis, which is defined by the bisector of the rear axle's total toe-in angle. The deviations between the longitudinal axis and the geometrical travel axis are not negligible for a measuring image sensor system, especially when it is used in driver assistance systems in motor vehicles, since the geometrical axis of travel determines the travel direction in straight-ahead travel, independently of the position of the longitudinal axis.

References to the determination of the alignment of an image sensor system with respect to the geometrical travel axis of the motor vehicle, for calibrating an image sensor system, are missing from European Patent reference EP 1 120 746.

SUMMARY OF THE INVENTION

By the determination of the alignment of at least one image sensor system with respect to the geometrical travel axis of the motor vehicle, the measuring accuracy of the image sensor system increases, which may be in an advantageous manner. There are deviations between the geometrical travel axis and the longitudinal axis, which, in a measuring image sensor system, especially when this is used in driver assistance systems, can lead to measuring errors, and are therefore not negligible.

In an especially advantageous way, the method described below and the device may provide for the direct determination of the alignment of the at least one image sensor system with respect to the geometrical travel axis of the motor vehicle from the image data of the at least one calibrating object generated by the at least one image sensor system itself. In an advantageous manner, it may be particularly sufficient to use only the image data for determining the alignment of the at least one image sensor system with respect to the geometrical travel axis of the motor vehicle. Consequently, the method described below is independent of the use of any additional data.

Advantageously, the data on the geometrical travel axis of the motor vehicle, contained in the generated image data, may be used. With that, the method and the device described below provide for calibrating the at least one image sensor system, particularly independently of the use of additional sensors, since all the necessary data for determining the alignment of the at least one image sensor system with respect to the geometric travel axis of the motor vehicle is contained in the image data. This reduces the expenditure on technical devices and thereby leads to low costs for the calibration of the at least one image sensor system.

By the alignment of at least one pointer at least one non-steered wheel of the motor vehicle, in which at least one marking point is generated on the at least one calibrating object, in an especially advantageous manner, data on the geometric travel axis of the motor vehicle may be transmitted to the at least one calibrating object. Especially when an optical pointer is used, for example, as a laser pointer, the generated light dots contain data as marking points about the geometric travel axis of the motor vehicle.

Advantageously, the alignment of a first and a second pointer, each having one pointer beam on a first and second non-steered wheel of the motor vehicle, represents a simple and cost-effective possibility of carrying out the method described below. The advantages may be provided by the use of only two pointers, which each generate only one pointer beam.

Advantageously, the alignment of a first and a second pointer, each having one pointer beam on a first and second non-steered wheel of the motor vehicle, together with the determination of at least one distance between the at least one calibrating object and the non-steered wheel may represent a simple and exact possibility of carrying out or performing the method described below. The advantages come about, on the one hand, by the use of only two pointers, which each generate only one pointer beam, and on the other hand, by the use of at least one distance. This leads to great exactness in the calibration of the at least one image sensor system. Furthermore, the use of at least one distance between the at least one calibrating object and the non-steered wheel, while carrying out the method, may advantageously permit a variable distance between the at least one calibrating object and the motor vehicle or the image sensor system.

Advantageously, the method and the device may be suitable for angles from 0° to 180° between the geometric travel axis and the calibrating object. This broad angle range may advantageously provide for the adaptation of the method and the device to the local place in the motor vehicle repair shop or on the production floor of motor vehicle manufacturer. Advantageously, the alignment of the calibrating object to the motor vehicle is such that the angle between the geometric travel axis and the calibrating object is close to perpendicular, and particularly amounts to exactly 90°. For example, during the alignment of the image sensor system in the direction of the geometric travel axis, that is, in the direction of the forward travel direction of the vehicle, or in the opposite direction, that is, in the direction backwards to the travel direction, this right-angled setting leads to great exactness in the calibration of the at least one image sensor system. Especially in response to the use of additional calibrating reference features on the calibrating object, an angle of approximately 90° leads to an increase in the accuracy of the calibration of the at least one image sensor system, because, on account of the perpendicular viewing angle of the image sensor system, distortions of the calibrating reference features become minimal.

Advantageously, the alignment of a first and a second pointer, each having one pointer beam on a first and second non-steered wheel of the motor vehicle, may represent a simple and accurate possibility of carrying out the method described below, since a precise alignment of the calibrating object to the motor vehicle may be omitted. Consequently, in a particularly advantageous manner, especially the determination of the position of the at least one image sensor system in the motor vehicle, and the determination of the alignment of the at least one image sensor system with respect to the geometric travel axis may be provided for.

In an especially advantageous manner, the method and the device described below may provide for the determination of the alignment of at least two image sensor systems to one another, the at least two image sensor systems photographing essentially the same scene. In particular, the method and the device described below may advantageously provide for the calibration of at least one stereo camera system with respect to the geometric travel axis of the motor vehicle.

Of advantage is the determination of at least one value of the intrinsic calibration data of the at least one image sensor system, which may be of the camera's principal point and/or the camera's principal distance and/or at least one distortion parameter and/or the determination of the influence of a glass pane in the light path of the at least one image sensor system. These intrinsic calibrating data may be advantageously determined at the same time, especially by the use of additional calibrating reference features. This saves time and costs, since this additional required calibration of the at least one image sensor system becomes unnecessary.

It may be particularly advantageous to use an electronic/optical range finder (distance measuring device) as pointer, since hereby there are carried out the determination of the distance between the at least one calibrating object and the non-steered wheel along at least one pointer beam, and the generation of a marking point by a single arrangement, the electronic/optical range finder. In particular, the latter's distance-measuring light beam may advantageously generate a light point as the marking point at the same time.

DETAILED DESCRIPTION

Figure 1:
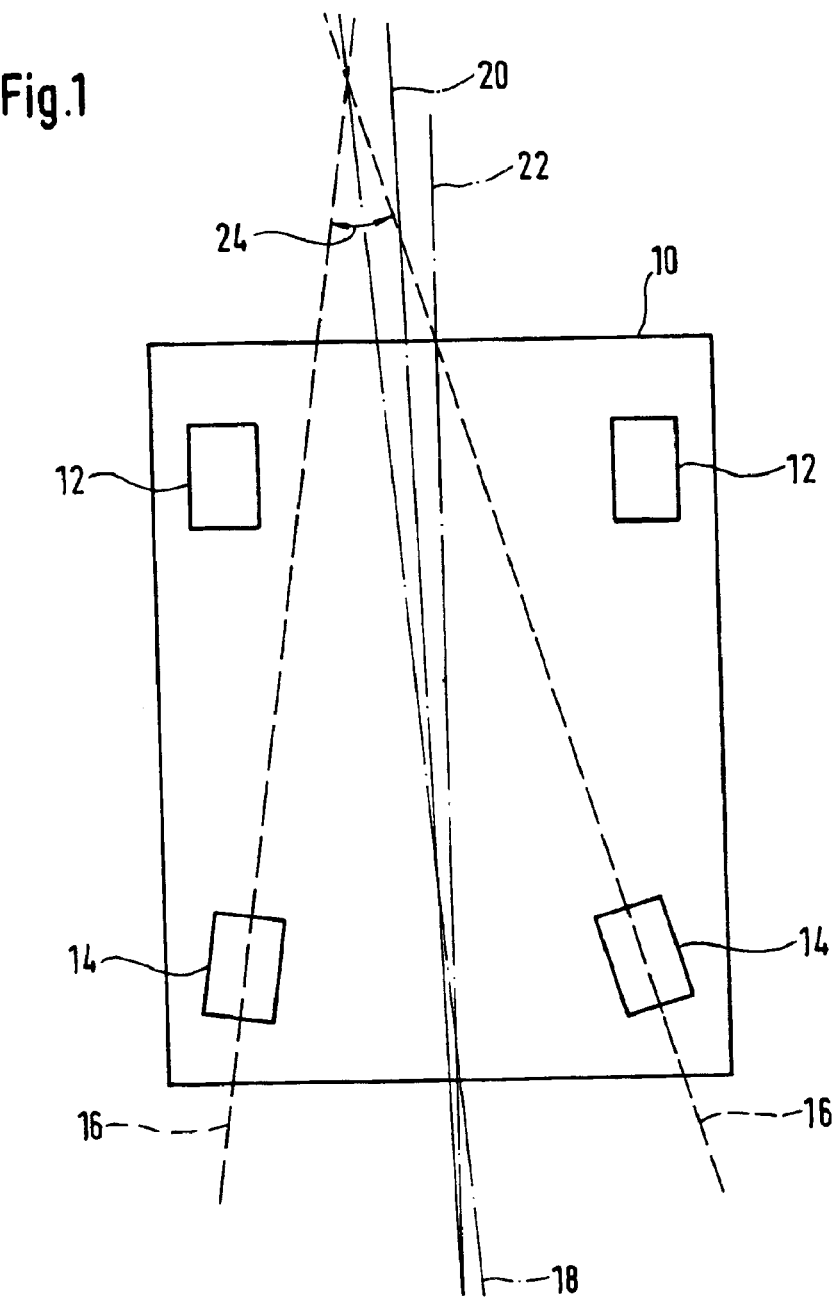
FIG. 1 shows a drawing to explain the definition of the geometric travel axis, of the vehicle's longitudinal central plane and the longitudinal axis of a motor vehicle.

FIG. 1 shows a drawing to explain the definition of geometric travel axis 18, vehicle longitudinal central plane 20 and longitudinal axis 22 of a motor vehicle 10. What is shown is a motor vehicle 10 having the two steered front wheels 12 of the front axle and the two non-steered rear wheels 14 of the rear axle. The front axle and the rear axle are each one wheel axis (axle). Geometric travel axis 18 is defined as the bisector of total toe-in angle 24 of the rear axle, total toe-in angle 24 being fixed by track 16 of the two rear wheels 14 of the rear axle. Geometric travel axis 18 is parallel to the roadway plane. The roadway plane has not been drawn in FIG. 1.

By comparison to that, vehicle longitudinal central plane 20 is a plane which is located perpendicular to the roadway plane, and which goes through the middle of the track width of the front and rear axles. Longitudinal axis 22 may be projected by symmetrical features of motor vehicle 10, especially the vehicle body. Travel axis 22 is parallel to the roadway plane. On account of manufacturing tolerances, geometric travel axis 18, vehicle longitudinal central plane 20 and longitudinal axis 22 generally do not coincide. Geometric travel axis 18 establishes the travel direction during straight-ahead driving of motor vehicle 10. Consequently, the travel direction at straight-ahead driving is independent of longitudinal axis 22 of the motor vehicle 10, and as a result is also independent of the alignment of the body with respect to the chassis. For the subsequent exemplary embodiments, the following definition of the motor vehicle coordinate system is used. The origin of the motor vehicle coordinate system lies in the middle of the rear axle of motor vehicle 10. The X axis of the motor vehicle coordinate system points positively in the travel direction along vehicle longitudinal central plane 20. The Y axis points positively to the left side of the vehicle when looking at motor vehicle 10 in the travel direction. The Z axis points positively upwards, away from the roadway plane.

Figure 2:
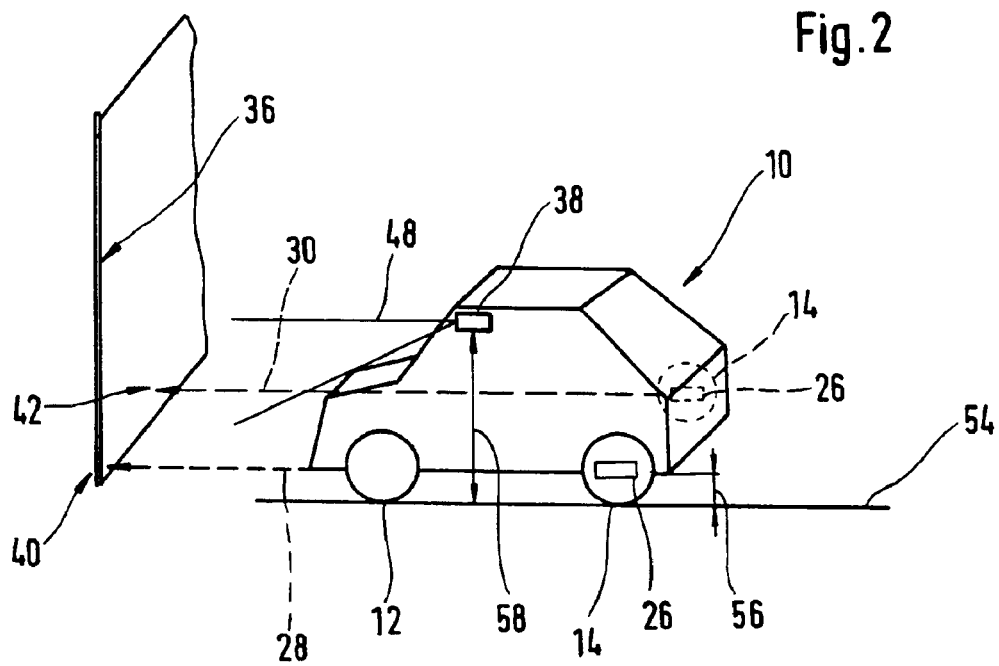
FIG. 2 shows an overall view drawing for calibrating at least one image sensor system in a motor vehicle in an exemplary embodiment, the alignment of the image sensor system with respect to the geometric travel axis of the motor vehicle being determined with the aid of two pointers each having one pointer beam.

FIG. 2 shows an overall view drawing for calibrating at least one image sensor system 38 in a motor vehicle 10 in an exemplary embodiment, the alignment of image sensor system 38 with respect to the geometric travel axis of motor vehicle 10 being determined with the aid of two pointers 26 each having one pointer beam 28, 30. In this exemplary embodiment, image sensor system 38 is affixed in motor vehicle 10 behind the windshield, in the vicinity of the inside rear view mirror at a distance 58 from roadway plane 54. Recording range 48 of image sensor system 38 is aligned in the forward driving direction of motor vehicle 10. Image sensor system 38 is a video sensor, which is designed, for example, either as a CCD camera or a CMOS camera. Motor vehicle 10 is located on roadway plane 54, for instance, in a motor vehicle repair shop or on the production floor of a motor vehicle manufacturer, motor vehicle 10 being aligned in such a way that recording range 48 of image sensor system 38 lies in the direction of calibrating object 36. In this exemplary embodiment, calibrating object 36 is a projection plane. In this context, the distance of image sensor system 38 from projection plane 36 may, for example, amount to between one meter and 20 meters, distances between two meters and ten meters may be suitably used. In this exemplary embodiment, the distance between image sensor system 38 and projection plane 36 amounts to about 2.5 meter.

An optical pointer 26 is mounted on both of the two non-steered rear wheels 14. Optical pointer 26 on left rear wheel 14 generates a pointer beam 28 in the form of a light beam, light beam 28 being aligned approximately parallel to roadway plane 54 and approximately parallel to the track of left rear wheel 14. In this context, light beam 28 produces a marking point 40 in the form of a light point on projection plane 36. Optical pointer 26 on right rear wheel 14 produces a pointer beam 30 in the form of a light beam, light beam 30 being aligned approximately parallel to roadway plane 54 and approximately parallel to the track of right rear wheel 14. In this context, light beam 30 produces a marking point 42 in the form of a light point on projection plane 36. Pointers 26 at left and right rear wheel have the same distance 56 to roadway plane 54. Light beams 28, 30 define the geometric travel axis of motor vehicle. Light points 40, 42 lie in the visual range (recording range 48) of image sensor system 38. Projection plane 36 is aligned, in this exemplary embodiment, perpendicular to the geometric travel axis of motor vehicle 10. This alignment happens either by positioning motor vehicle 10 relative to projection plane 36 or vice versa, the positioning of projection plane 36 relative to motor vehicle 10 being easier from a process engineering point of view. After the positioning and aligning have taken place, image sensor system 38 records image data of projection plane 36, which may be in the form of at least one image as an image data set. For calibrating image data system 38, the alignment with respect to the geometric travel axis of vehicle 10 is determined from the generated image data.

Figure 3:
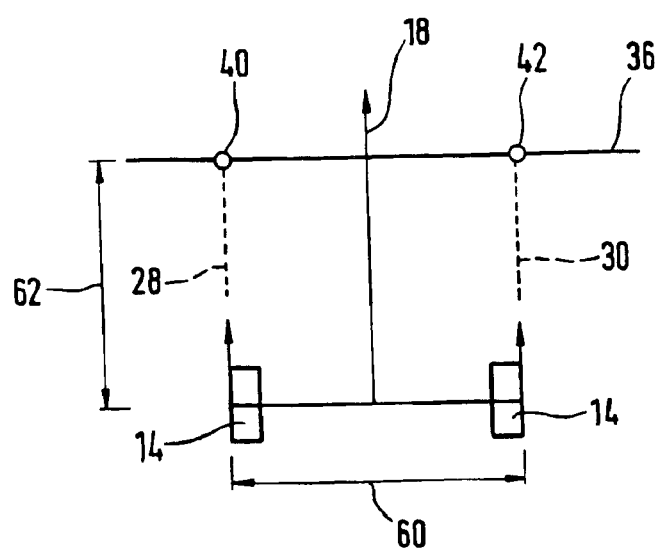
FIG. 3 shows the perpendicular alignment of the projection plane with respect to the geometric travel axis of a motor vehicle at parallel track (toe) of the rear wheels.

FIG. 3 shows the perpendicular alignment of projection plane 36 with respect to geometric travel axis 18 of a motor vehicle, at parallel tracks of rear wheels 14 for the exemplary embodiment according to FIG. 2. Besides that, FIG. 3 shows the two rear wheels 14 of a motor vehicle along with the two light beams 28 and 30, which produce the two light points 40 and 42 on projection plane 36. The optical pointers, which generate light beams 28, 30 and are mounted respectively on left and right rear wheel, are not shown. Moreover, distance 60 between the two optical pointers and distance 62 between the wheel centers of the two rear wheels 14 and projection plane 36 are shown, projection plane 36 being aligned perpendicular to geometric travel axis 18. In the case of this parallel track of rear wheels 14 of the motor vehicle, projection plane 36 may be aligned mechanically in such a way that light beams 28, 30 impinge upon projection plane 36 perpendicularly. A perpendicular projection of light beams 28, 30 is fulfilled if light beams 28, 30 reflect back on themselves (reflect along the input path) or a 90° reflecting prism produces in each case at light points 40, 42 a luminous trace in all directions in projection plane 36. A simplification of the alignment comes about from a projection plane 36 which is already perpendicular to the roadway plane, so that a rotation of projection plane 36 has to take place only about an axis that is perpendicular to the roadway plane.

Figure 4:
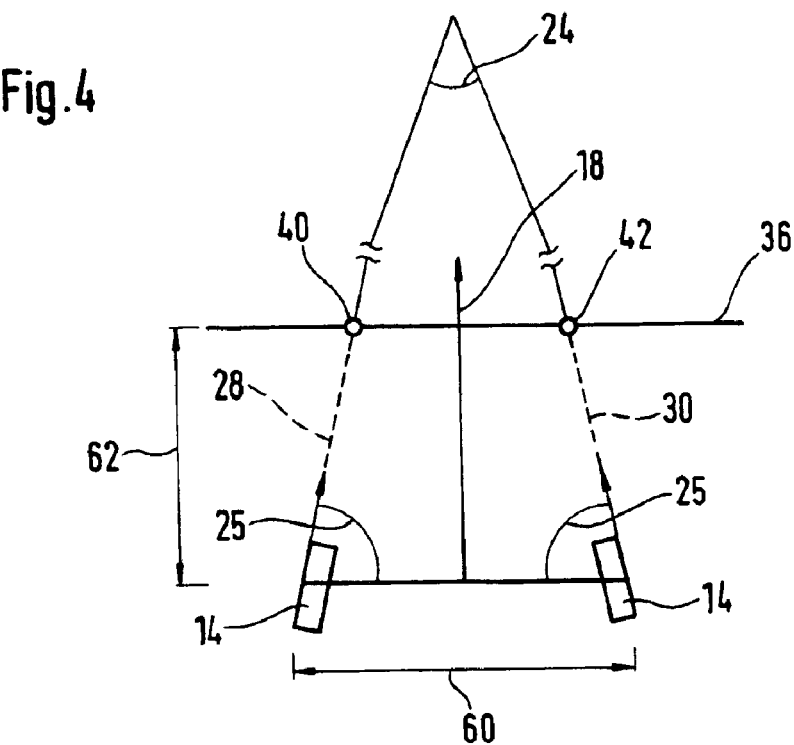
FIG. 4 shows the perpendicular alignment of the projection plane with respect to the geometric travel axis of a motor vehicle at nonparallel but symmetrical track of the rear wheels.

FIG. 4 shows the perpendicular alignment of projection plane 36 with respect to geometric travel axis 18 of a motor vehicle, at nonparallel but symmetrical tracks of rear wheels 14 for the exemplary embodiment according to FIG. 2. Besides that, FIG. 4 shows the two rear wheels 14 of a motor vehicle along with the two light beams 28 and 30, which produce the two light points 40 and 42 on projection plane 36. The optical pointers, which generate light beams 28, 30 and are mounted respectively on left and right rear wheel 14, are not shown. Moreover, distance 60 between the two optical pointers and perpendicular distance 62 between the wheel centers of the two rear wheels 14 and projection plane 36 are shown, projection plane 36 being aligned perpendicular to geometric travel axis 18. Besides that, toe-in angles 25 of the two rear wheels 14 are drawn in, the sizes of the toe-in angles 25 being equal. Total toe-in angle 24 is also drawn in schematically. In this case the perpendicular alignment of projection plane 36 with respect to geometric travel axis 18 of a motor vehicle takes place in three steps. In the first step projection plane 36 may be mechanically aligned in such a way that projection plane 36 is perpendicular to one of light beams 28, 30, let us say to light beam 28. In the second step projection plane 36 is mechanically aligned in such a way that projection plane 36 is perpendicular to second light beam 28, 30, in this example, to light beam 30. The rotation of projection plane 36 about the angle x is ascertained so that, in the third step, one may set projection plane 36 to the half angle x/2. Thereby projection plane 36 is perpendicular to geometric travel axis 18. A perpendicular projection of light beams 28, 30 is then fulfilled if light beams 28, 30 reflect back on themselves or a 90° reflecting prism produces in each case at light points 40, 42 a luminous trace in all directions in projection plane 36.

Figure 5:
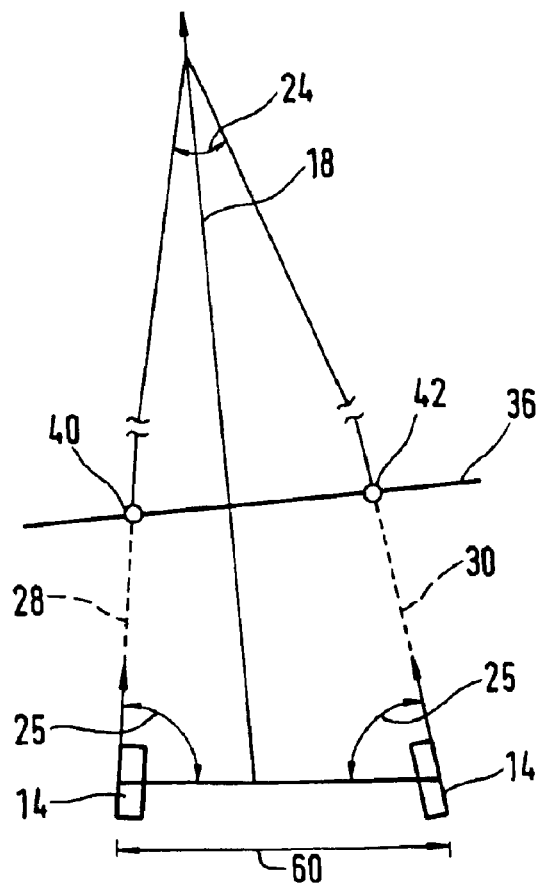
FIG. 5 shows the perpendicular alignment of the projection plane with respect to the geometric travel axis of a motor vehicle at nonparallel but symmetrical track of the rear wheels.

FIG. 5 shows the perpendicular alignment of projection plane 36 with respect to geometric travel axis 18 of a motor vehicle, at nonparallel and nonsymmetrical tracks of rear wheels 14 for the exemplary embodiment according to FIG. 2. Besides that, FIG. 5 shows the two rear wheels 14 of a motor vehicle along with the two light beams 28 and 30, which produce the two light points 40 and 42 on projection plane 36. The optical pointers, which generate light beams 28, 30 and are mounted respectively on left and right rear wheel 14, are not shown. Furthermore, the distance 60 between the two optical pointers is shown Besides that, toe-in angles 25 of the two rear wheels 14 are drawn in, the size of the toe-in angles 25 being unequal. Total toe-in angle 24 is also drawn in schematically. In this case, the perpendicular alignment of projection plane 36 with respect to geometric travel axis 18 of a motor vehicle takes place in three steps. In the first step projection plane 36 may be mechanically aligned in such a way that projection plane 36 is perpendicular to one of light beams 28, 30, let us say to light beam 28. In the second step projection plane 36 is mechanically aligned in such a way that projection plane 36 is perpendicular to second light beam 28, 30, in this example, to light beam 30. The rotation of projection plane 36 about the angle x is ascertained so that, in the third step, one may set projection plane 36 to the half angle x/2. Thereby, projection plane 36 is perpendicular to geometric travel axis 18. A perpendicular projection of light beams 28, 30 is then fulfilled if light beams 28, 30 reflect back on themselves or a 90° reflecting prism produces in each case, at light points 40, 42, a luminous trace in all directions in projection plane 36.

Figure 6:
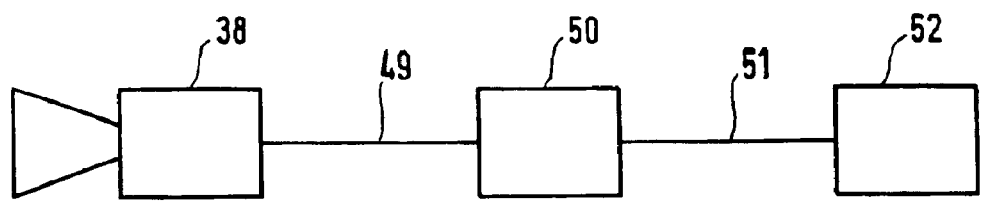
FIG. 6 shows a block diagram of the device for calibrating an image sensor system.

FIG. 6 shows a block diagram of the device for calibrating an image sensor system 38 as in FIG. 2, especially for processing and evaluating the image data made up of image sensor system 38 itself, an evaluating unit 50 and at least one, which may be subsequent system 52, such as a storage unit 52. The at least one image photographed, after alignment of the projection plane by image sensor system 38 has taken place, may be transmitted, electrically and/or optically, to evaluation unit 50 via signal line 49, in the form of at least one image data set. Alternatively, transmission of the at least one image data set by radio is a possibility. In this context, evaluation unit 50 may be positioned separately from image sensor system 38, and may thus be especially in the motor vehicle or outside of it, or evaluation unit 50 is directly in image sensor system 38. Evaluation unit 50 includes at least one microprocessor and is made up of a plurality of modules shown in FIG. 7, which are designed as programs of the at least one microprocessor. From the image data, evaluation unit 50 ascertains at least one parameter of the calibrating data, especially the yaw angle and/or the pitch angle and/or the roll angle and/or the at least one parameter of the three-dimensional installation position of image sensor system 38 in the motor vehicle. In this context, the yaw angle is defined as the horizontal angular deviation of the optical axis or of the normal of the image plane of image sensor system 38 from the geometric travel axis.

By pitch angle is understood the vertical angle deviation of the optical axis or the normal of the image plane of image sensor system 38 from the geometric travel axis. By roll angle is understood the rotation of image sensor system 38 about the optical axis with respect to the roadway plane. The parameters of the calibrating data are transmitted, electrically and/or optically, to at least one, which may be subsequent system 52, such as a storage unit 52, via signal line 51. Alternatively, transmission by radio is a possibility. In this context, system 52 may be positioned separately from image sensor system 38, or system 52 is located directly in image sensor system 38. Besides that, the parameters of the calibrating date may be used either to adjust image data system 38 mechanically or the calibrating data are used to manipulate subsequent applications, which process image data during the operation of image sensor system 38, by software, that is, according to an algorithm. This ensures imaging serviceable for the application purpose and/or the recording of the measuring value by image sensor system 38.

Figure 7:
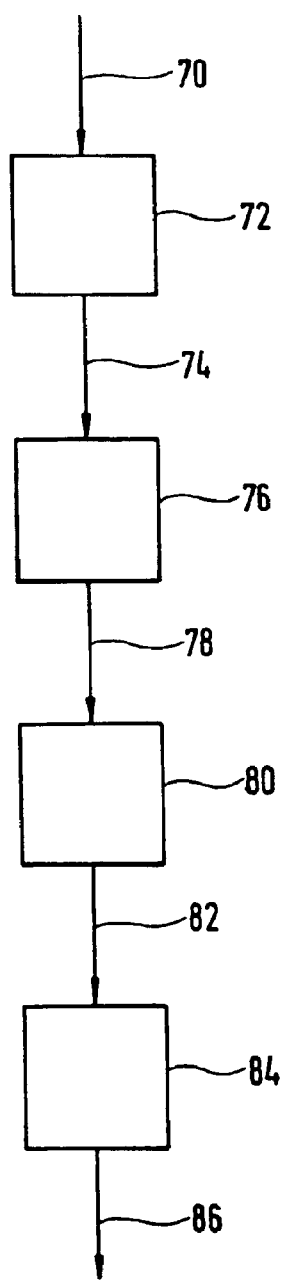
FIG. 7 shows a flow chart for determining the calibrating data.

FIG. 7 shows a flow chart for determining at least one parameter of calibrating data 86 for the exemplary embodiment as in FIG. 2. Image sensor signals 70 of signal line 49 as in FIG. 6, which include image data of the projection plane in the form of at least one image data set, are supplied to module 72 for preprocessing. This module 72 is used to form the preprocessed image data 74. For the preprocessing, contrast improvement and/or a change in image brightness and/or image improvement by filtering are undertaken in particular. Preprocessed image data 74 are supplied to module 76 for feature identification. This module 76 is used particularly for searching for and identifying the light point generated by the pointer in preprocessed image data 74. These significant features in the image are ascertained using known methods for image processing.

In particular, either methods using specifiable gray-scale value thresholds and/or edge methods and/or contour tracing methods are used. Data 78 ascertained in module 76 are supplied to module 80 for determining the 2D position (two-dimensional position) of the light points. In this context, in particular, a determination of the 2D position of the light points is carried out that is accurate either to the nearest pixel or to the nearest subpixel. In particular, as the method, center of gravity operators, such as gray-scale value sums and/or average formation, and/or structure operators, such as edge of circle or edge of ellipse and/or a sample gray-scale value matrix is used. In the case of a method using a sample gray-scale value matrix, a template matching is involved in which an artificially defined gray-scale value matrix of a feature is placed as well as possible over the imaged feature, the light point, and thereby the 2D position is ascertained.

The ascertained 2D position of the light points, that is, the image coordinates of the light points, are conducted as data 82 to module 84 for calculating at least one parameter of calibrating data 86. As the parameter of calibrating data 86 for calibrating an image sensor system in a motor vehicle, a distinction is basically made between intrinsic and extrinsic calibrating data. Intrinsic calibrating data are especially the camera's principal point and/or the camera's principal distance and/or at least one distortion parameter. A differentiation is made between six parameters for the extrinsic calibrating data. The three translational parameters xk, yk and zk describe the mounting position of the image sensor system with respect to the motor vehicle, and thus they indicate the vector from the origin of the motor vehicle coordinate system to the projection center of the image sensor system. Besides the three translational parameters, a distinction is made between the three rotational angles, yaw angle, pitch angle and roll angle.

In this exemplary embodiment, the method described in FIG. 7 for ascertaining at least one parameter of the extrinsic calibrating data is used. The method and the device are basically also suitable for ascertaining intrinsic calibrating data, as will be explained in the subsequent sections. In the exemplary embodiment as in FIG. 2, four measured values are ascertained from the two light points in module 80. The 2D position of each light point is ascertained. Thus there are four measured values compared to the six parameters of the required extrinsic calibrating data. With that, four of the parameters of the required extrinsic calibrating data can be calculated, In the exemplary embodiment as in FIG. 2, in particular, the three rotational angles and a translational parameter are determined.

For this, available numerical photogrammetrical methods are used in module 84. Direct linear transformation (DLT) may be used. Alternatively, the method of spatial resection may be used. Using the approach of DLT, one may successfully determine at least one parameter of calibrating data 86 without approximating values in a linear system of equations. The method is based on projective relationships between object space and image space, which are broadened by an affine transformation of the image coordinates. Using the method of spatial resection, there is available a nonlinear solution of set-up collinearity equations which requires approximate values of the required parameters of the calibrating data. The solution is obtained iteratively according to the least squares method in a balancing calculation. For this purpose, error equations of the observations are derived from the collinearity equations. The image coordinates of the features measured in the image, thus, particularly the 2D position of the light points in the image are taken to be the observations. The setting up and solving of the so-called normal equation is done iteratively, until the required parameter of calibrating data 86 no longer changes significantly.

For the calculation of the four parameters in the exemplary embodiment according to FIG. 2, additional data are required, particularly the distance of the pointer from the roadway plane (such as distance 56 in FIG. 2) and/or the distance between the two optical pointers (such as distance 60 in FIG. 3) and/or at least one distance between the wheel centers of the rear wheels and the projection plane (such as distance 62 in FIG. 3 and/or the length of Light beam 28, 30 in FIG. 4 and/or the length of light beam 28, 30 in FIG. 5) and/or at least one toe-in angle (such as toe-in angle 25 in FIG. 4 and/or toe-in angle 25 in FIG. 5). These data may be either defined structurally and known that way and/or the data are also recorded additionally by measuring technology.

An alternative variant of the exemplary embodiment according to FIG. 2 provides measuring, using a range finder, at least one distance on the left and/or the right vehicle side between the non-steered axle, i.e. the wheel center of the non-steered wheel and the projection plane. The measured distances are used for the alignment, which may be perpendicular, of the projection plane with respect to the geometric travel axis of the motor vehicle. According to FIG. 3, a perpendicular projection of the light beams of the two pointers comes about particularly when the projection plane is already positioned perpendicularly to the roadway plane, and the projection plane is rotated about the axis that is perpendicular to the roadway plane, until the two measured distances are the same. In a further variant, it is provided that one should use an electronic/optical range finder as range finder, whose measuring light beam generates the light point. Alternatively, the measured distances are used particularly, as explained in FIG. 7, as data recorded by measuring technology for calculating at least one parameter of the calibrating data.

Figure 8:
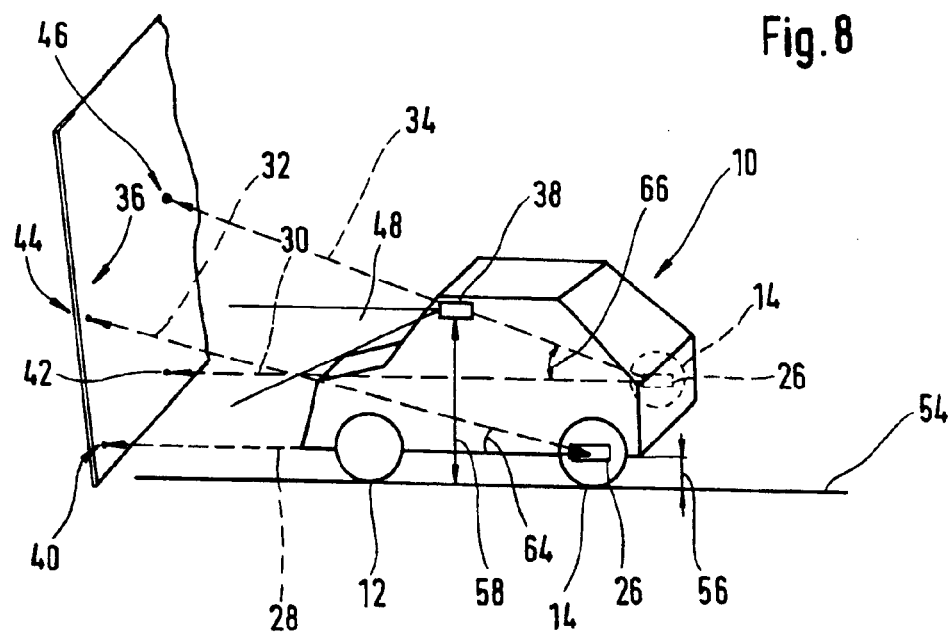
FIG. 8 shows an overall view drawing for calibrating at least one image sensor system in a motor vehicle in an exemplary embodiment, the alignment of the image sensor system with respect to the geometric travel axis of the motor vehicle being determined with the aid of two pointers each having two pointer beams.

FIG. 8 shows an overall view drawing for calibrating at least one image sensor system 38 in a motor vehicle 10 in an exemplary embodiment, the alignment of image sensor system 38 with respect to the geometric travel axis of motor vehicle 10 being determined with the aid of two pointers 26, each having two pointer beams 28, 30, 32, 34. In this exemplary embodiment, image sensor system 38 is affixed in motor vehicle 10 behind the windshield, in the vicinity of the inside rear view mirror at a distance 58 from roadway plane 54. Recording range 48 of image sensor system 38 is aligned in the forward driving direction of motor vehicle 10. Image sensor system 38 is a video sensor, which is designed, for example, either as a CCD camera or a CMOS camera. Motor vehicle 10 is located on roadway plane 54, for instance, in a motor vehicle repair shop or on the production floor of a motor vehicle manufacturer, motor vehicle 10 being aligned in such a way that recording range 48 of image sensor system 38 lies in the direction of calibrating object 36.

In this exemplary embodiment, calibrating object 36 is a projection plane. In this context, the distance of image sensor system 38 from projection plane 36 may, for example, amount to between one meter and 20 meters. Distances between two meters and ten meters may be suitably used. In this exemplary embodiment, the distance between image sensor system 38 and projection plane 36 amounts to about 2.5 meter. An optical pointer 26, having a range finder, is mounted on both of the two non-steered rear wheels 14 of the rear axle. Optical pointer 26 on left rear wheel 14 generates a pointer beam 28 in the form of a light beam, light beam 28 being aligned approximately parallel to roadway plane 54 and approximately parallel to the track of left rear wheel 14. In this context, light beam 28 produces a marking point 40 in the form of a light point on projection plane 36. Optical pointer 26 on right rear wheel 14 produces a pointer beam 30 in the form of a light beam, light beam 30 being aligned approximately parallel to roadway plane 54 and approximately parallel to the track of right rear wheel 14. In this context, light beam 30 produces a marking point 42 in the form of a light point on projection plane 36. Pointers 26 at left and right rear wheel 14 have the same distance 56 to roadway plane 54.

In each case a second light beam 32, 34, at an angle 64, 66 with respect to the first light beam generates two light points 44, 46 on the projection plane. The range finder of pointer 26 on the left vehicle side determines the distances between the non-steered axle, that is, the wheel center of the non-steered wheel, and the projection plane along light beams 28, 32. The range finder of pointer 26 on the right vehicle side determines the distances between the non-steered axle, that is, the wheel center of the non-steered wheel, and the projection plane along light beams 30, 34. Angles 64, 66 are known and may be equal in this exemplary embodiment. The distance between left and right pointer 26 is known. Distance 56 of the two pointers from roadway plane 54 is known, and is of the same size in this exemplary embodiment. Light beams 28, 30, 32, 34 define the geometric travel axis of motor vehicle 10.

A precise alignment of projection plane 36 is not necessary in this exemplary embodiment. Light points 40, 42, 44, 46 lie in the visual range (recording range 48) of image sensor system 38. Image sensor system 38 records image data of projection plane 36, which may be in the form of at least one image as an image data set. For calibrating image data system 38, the alignment with respect to the geometric travel axis of vehicle 10 is determined from the generated image data.

Figure 9:
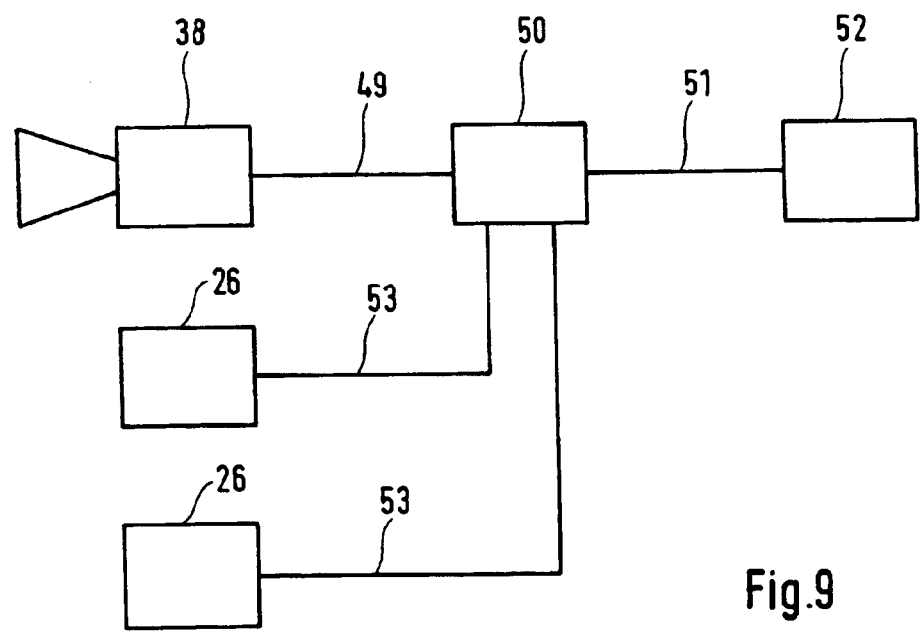
FIG. 9 shows a block diagram of the device for calibrating an image sensor system.

FIG. 9 shows a block diagram of the device for calibrating an image sensor system 38 as in FIG. 8, especially for processing and evaluating the image data made up of image sensor system 38 itself, pointer 26 having a range finder of the left wheel, pointer 26 having a range finder of the right wheel, an evaluating unit 50 and at least one, which may be subsequent system 52, such as a storage unit 52. The at least one image photographed, after alignment of the projection plane by image sensor system 38 has taken place, is transmitted, electrically and/or optically, to evaluation unit 50 via signal line 49, in the form of at least one image data set. Alternatively, transmission of the at least one image data set by radio may be done.

The distances ascertained by the two measuring devices of pointers 26, which are fastened to the left and the right wheel, are transmitted electrically and/or optically via signal lines 53 to evaluation unit 50. Alternatively, transmission by radio is a possibility. In this context, evaluation unit 50 may be positioned separately from image sensor system 38 and/or from pointers 26, thus being located particularly inside the motor vehicle or perhaps outside of it. However, the evaluation unit 50 may be located directly in image sensor system 38 and/or in at least one pointer 26. Evaluation unit 50 includes at least one microprocessor and is made up of a plurality of modules shown in FIG. 10, which are developed as programs of the at least one microprocessor. From the image data and the measured distances, evaluation unit 50 ascertains at least one parameter of the calibrating data, especially the yaw angle and/or the pitch angle and/or the roll angle and/or the at least one parameter of the three-dimensional installation position of image sensor system 38 in the motor vehicle.

In this context, the yaw angle is defined as the horizontal angular deviation of the optical axis or of the normal of the image plane of image sensor system 38 from the geometric travel axis. By pitch angle is understood the vertical angular deviation of the optical axis or the normal of the image plane of image sensor system 38 from the geometric travel axis. By roll angle is understood the rotation of image sensor system 38 about the optical axis with respect to the roadway plane. The parameters of the calibrating data are transmitted, electrically and/or optically, via signal line 51 to at least one, which may be subsequent system 52, such as a storage unit 52. Alternatively, transmission by radio is a possibility. In this context, system 52 may be positioned separately from image sensor system 38, or system 52 is located directly in image sensor system 38. Besides that, the parameters of the calibrating date may be used either to adjust image data system 38 mechanically or the calibrating data are used to manipulate subsequent applications, which process image data during the operation of image sensor system 38, by software, that is, according to an algorithm. This ensures imaging serviceable for the application purpose and/or the recording of the measuring value by image sensor system 38.

Figure 10:
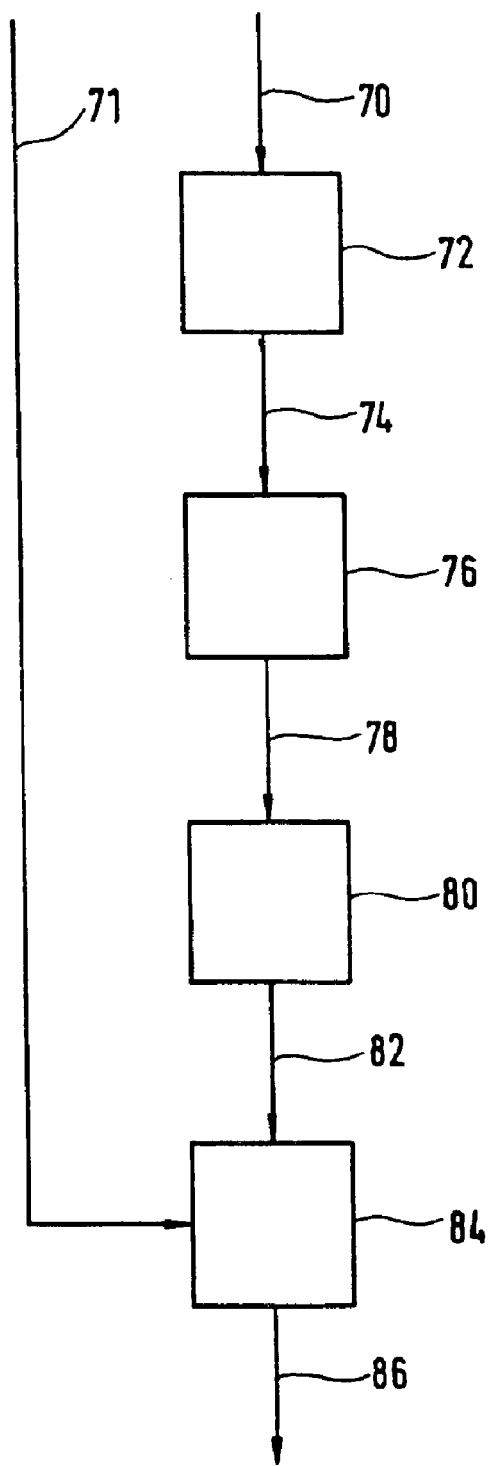
FIG. 10 shows a flow chart for determining the calibrating data.

FIG. 10 shows a flow chart for determining at least one parameter of calibrating data 86 for the exemplary embodiment as in FIG. 8. Image sensor signals 70 of signal line 49 as in FIG. 9, which include image data of the projection plane in the form of at least one image data set, are supplied to module 72 for preprocessing. This module 72 is used to form the preprocessed image data 74. For the preprocessing, contrast improvement and/or a change in image brightness and/or image improvement by filtering are undertaken in particular. Preprocessed image data 74 are supplied to module 76 for feature identification. This module is used particularly for searching for and identifying the light points generated by the pointer in preprocessed image data 74. These significant features are ascertained using known methods for image processing. In particular, either methods using specifiable gray-scale value thresholds and/or edge methods and/or contour tracing methods are used as the method.

Data 78 ascertained in module 76 are supplied to module 80 for determining the 2D position (two-dimensional position) of the light points. In this context, in particular, a determination of the 2D position of the light points is carried out that is accurate either to the nearest pixel or to the nearest subpixel. In particular, as the method, center of gravity operators, such as gray-scale value sums and/or average formation, and/or structure operators, such as edge of circle or edge of ellipse and/or a sample gray-scale value matrix are used. In the case of a method using a sample gray-scale value matrix, template matching is involved in which an artificially defined gray-scale value matrix of a feature is placed as well as possible over the imaged feature, the light point, and thereby the 2D position is ascertained. The ascertained 2D position of the light points, that is, the image coordinates of the light points, are conducted as data 82 to module 84 for calculating at least one parameter of calibrating data 86. As the parameter of calibrating data 86 for calibrating an image sensor system in a motor vehicle, a distinction is basically made between intrinsic and extrinsic calibrating data. Intrinsic calibrating data are especially the camera's principal point and/or the camera's principal distance and/or at least one distortion parameter. A differentiation is made between six parameters for the extrinsic calibrating data.

The three translational parameters xk, yk and zk describe the mounting position of the image sensor system with respect to the motor vehicle, and thus they indicate the vector from the origin of the motor vehicle coordinate system to the projection center of the image sensor system. Besides the three translational parameters, a distinction is made between the three rotational angles, yaw angle, pitch angle and roll angle. In this exemplary embodiment, the method described in FIG. 10 for ascertaining at least one parameter of the extrinsic calibrating data is used. The method and the device are basically also suitable for ascertaining intrinsic calibrating data, as will be explained in the subsequent sections. In the exemplary embodiment as in FIG. 8, eight measured values are ascertained from the four light points in module 80. The 2D position of each light point is ascertained. Distance signals 71 of signal line 53 according to FIG. 9 are also supplied to module 84. From the measured distances derived from distance signals 71, and from the ascertained 2D positions of the light points, at least one parameter of calibrating data 86 is ascertained in module 84, using known numerical, photogrammetrical methods, particularly the yaw angle and/or the roll angle and/or the pitch angle and/or at least one parameter of the three-dimensional mounting position of the image sensor system in the motor vehicle coordinate system. Direct linear transformation (DLT) may be used.

Alternatively, the method of spatial resection may be used. Using the approach of DLT, one may successfully determine at least one parameter of calibrating data 86 without approximating values in a linear system of equations. The method is based on projective relationships between object space and image space, which are broadened by an affine transformation of the image coordinates. Using the method of spatial resection, there is available a nonlinear solution of set-up collinearity equations which requires approximate values of the required parameters of the calibrating data 86. The solution is obtained iteratively according to the least squares method in a balancing calculation. For this purpose, error equations of the observations are derived from the collinearity equations. The image coordinates of the features measured in the image, thus, particularly the 2D position of the light points in the image are here taken to be the observations.

The setting up and solving of the so-called normal equations is done iteratively, until the required parameter of calibrating data 86 no longer changes significantly. For the calculation of at least one parameter of calibrating data 86 in the exemplary embodiment according to FIG. 8, additional constructional data are used to increase the measuring accuracy, particularly the distance of the pointers from the roadway plane (such as distance 56 in FIG. 8) and/or the distance between the two optical pointers and/or at least one angle between the first and the second light beam of a pointer (such as angle 64, 66 in FIG. 8) are used. These data may be either defined structurally and known that way and/or the data are also recorded additionally by measuring technology.

Figure 11:
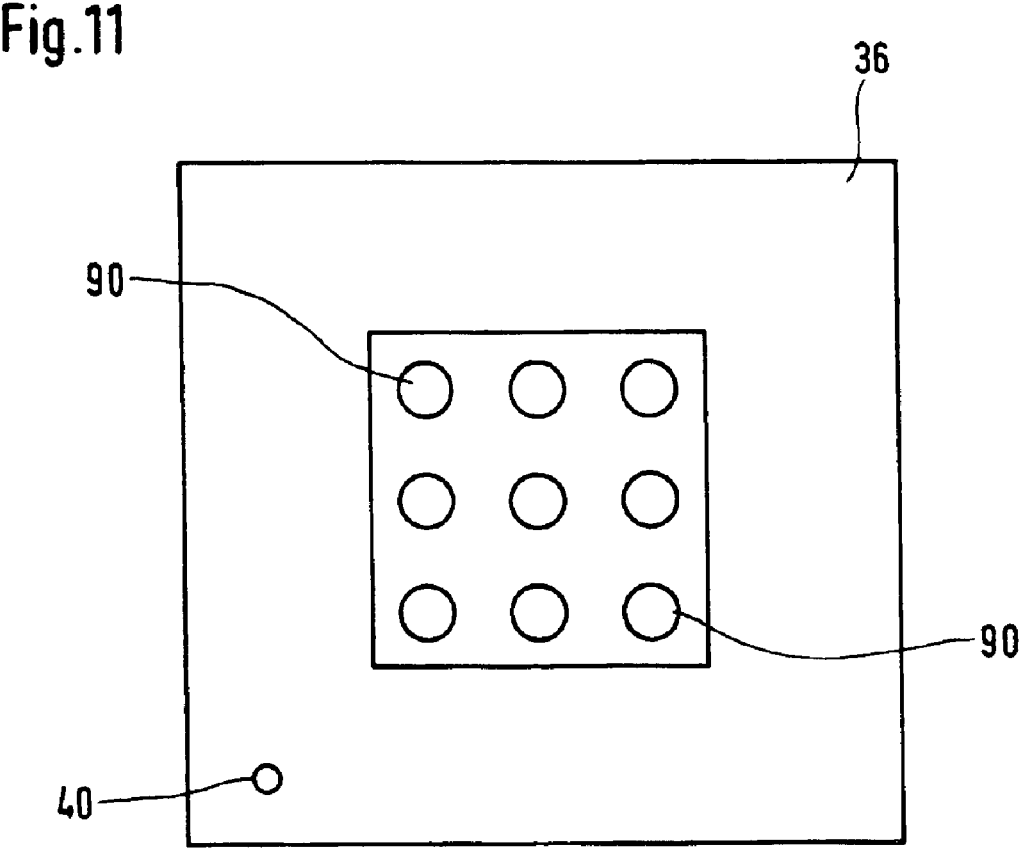
FIG. 11 shows a calibrating object.

FIG. 11 shows a calibrating object 36 for use in one of the preceding exemplary embodiments. Calibrating object 36 in FIG. 11 is developed as a projection plane. In FIG. 11, for example, nine reference features 90 and one light point 40 are drawn in as marking points. The mutual spatial positions of reference features 90 are known to the evaluating device. Reference features 90 come about due to the structure of the projection plane, or are applied especially. For the reliable detecting of reference features 90, these have a known geometrical shape, and/or reference features 90 are developed actively luminous and/or reference features 90 are designed as retroreflecting markers. Using the recording of reference features 90, particularly in the preceding exemplary embodiments, additional camera-specific, i.e. intrinsic parameters of the calibrating data are also determined at the same time. Reference features 90 are developed so as to provide for a simple automatic recording in the images of the at least one image sensor system.

Reference features 90 shown in FIG. 11 are circular and optically diffusely reflecting. Reference Features 90 have a diameter that is selected as a function of the imaging scale of the at least one image sensor system and the recording device. Reference features 90 are automatically differentiated by at least one reference feature 90 bearing a coding detectable by at least one image sensor system, or by reference features 90 being positioned in groups having a defined geometry. The detectability of reference features 90 is aided by the measure of using at least one light source for illuminating the reference features. In particular, at least one light source in the vicinity of the objective of the image sensor system aids to detectability of retroreflecting reference features 90. In one variant, the light source emits light in the spectrum of the infrared. This avoids an adverse influence by the lighting conditions on people at the measuring location. If reference features 90, in addition to the even, planar arrangement with respect to the at least one image sensor system shown in FIG. 11, are also spatially offset on projection plane 36, evaluation with respect to an even arrangement of reference features 90 is simplified, and the measuring results are more reliable. Using reference features 90, an influence distorting the optical imaging may be codetermined additionally, which might be caused, for example, by a windshield between the image sensor system and the object.

The method described before and the device are also suitable for simultaneously calibrating more than one image sensor system. In particular, during the evaluation, the mutual allocation of two or more image sensor systems may be produced, which record objects from at least two different perspectives, so that they may be reconstructed three-dimensionally from the images. In particular, the method described before and the device are suitable for calibrating stereo cameras which are composed of two image sensor systems that essentially photograph the same scene. In this context, either the alignment of the image sensor system is determined separately for each image sensor system with respect to the geometric travel axis of the motor vehicle, and from this the alignment of the image sensor systems with respect to each other is ascertained, or the determination of the mutual allocation of the image sensor systems and the alignment of the stereo camera with respect to the geometric travel axis of the motor vehicle is performed jointly in one evaluation step.

Besides the alignment of the at least one image sensor system in the travel direction of the motor vehicle according to one of the preceding exemplary embodiments, the method and the device is also suitable for the calibration of an image sensor system which has an alignment deviating from that direction. In particular, calibrating of at least one image sensor system may be done, which is aligned in the direction backwards from the travel direction of the motor vehicle.

For the preceding exemplary embodiments it is true that, as a function of the number of marking points on the calibrating object, i.e. of light points in the projection plane, a different number of parameters of the calibrating data is determinable. Four parameters of the calibrating data may be determined by two marking points, while in case of at least three marking points all six extrinsic parameters of the calibrating data are determinable. In case of more than three marking points, a redundancy in determination may be provided for by the fitting of observations.

In one variant of the method described above and the device, as optical pointers, especially for all the exemplary embodiments described, optical pointers may be used which emit light in the ultraviolet range and/or in the visible range and/or in the infrared range. Laser pointers and/or pointers having conventional light sources may be used. The assumption for using the optical pointer is only that the marking point produced on the at least one calibrating object is detectable by the at least one image sensor system. The method described above and the device are not limited to optical pointers. Rather, all types of pointer may be used which produce a marking point on the calibrating object for carrying out the method. In particular, mechanical pointers which generate, for example, a color marking on the at least one calibrating object may be used.

In one variant of the preceding exemplary embodiments, only a pointer is used which, during the measurement, is mounted and aligned at different locations determined by the method, the method being sequentially carried out by taking several images by the at least one image sensor system.

For the preceding exemplary embodiments, the accuracy of the method for calibrating at least one image sensor system is increased if the image sensor system takes more than one image. This is achieved in that the measurements of the marking points identified in the image and of the at least one parameter of the calibrating data, especially the yaw angle and/or the pitch angle and/or the roll angle of the image sensor system are averaged.

In one variant of the preceding exemplary embodiments, the projection plane is made up of separate, i.e. separated individual planes for each light point, which are aligned independently of one another. In a further variant of the preceding exemplary embodiments, a single projection plane is provided. The method may be sequentially performed by sequentially aligning the project plane taking at least one image per light point. For instance, if the project plane is so small in its dimensions, only a single light point may be projectable. The evaluation takes place corresponding to the statements on the preceding exemplary embodiments, data from several images being used.

In one variant of the method described and the device, the calibrating object is not aligned perpendicularly to the geometric travel axis of the motor vehicle. Rather, an angle between 0° and 180° is selected. The assumption for this is that the at least one calibrating object is in the recording range of the at least one image sensor system.

In one additional variant of the method for calibrating at least one image sensor system, which is located at (e.g., on and/or in and/or on top) of a motor vehicle, using at least one calibrating object, in each case at least one image is taken of one calibrating object using at least one image sensor system from at least two different positions. From this, for the calibration, the alignment of the at least one image sensor system with respect to the geometric travel axis of the motor vehicle is determined. The two different positions of the motor vehicle are taken up by the moving on of the motor vehicle using its own wheels. From the photographing positions of the at least one image sensor system reconstructed using known numerical, photogrammetrical methods, the direction of the geometric travel axis is calculated, and the direction of the optical axis of the at least one image sensor system with respect to the geometric travel axis is ascertained.

What is claimed is:

1. A method for calibrating at least one image sensor system which is located at a motor vehicle, by the use of at least one calibrating object, the method comprising:

generating, using the at least one image sensor system, image data of the at least one calibrating object;

determining, from generated image data of the at least one calibrating object, an alignment of the at least one image sensor system with respect to a geometric travel axis of the motor vehicle, the geometric travel axis being a bisector of a total toe-in angle of a rear axis of the vehicle; end determining a calibration using a determined alignment of the at least one image sensor system with respect to the geometric travel axis of the motor vehicle.

2. The method of claim 1, wherein the data on the geometric travel axis of the motor vehicle included in the generated image data are used.

3. The method of claim 1, wherein there are at least two image sensor systems which image essentially the same scene, and the alignment of each of the image sensor systems with respect to the geometric travel axis of the motor vehicle is determined separately for each of the image sensor systems, from which the alignment of the image sensor systems to each other is determined.

4. The method of claim 3, wherein the at least two image systems includes at least a stereo camera system.

5. The method of claim 1, wherein at least one value of intrinsic calibration data of the at least one image sensor system is determined.

6. The method of claim 1, wherein the generating, using the at least one image sensor system, of the image data of the at least one calibrating object, is in at least one image data set.

7. A method for calibrating at least one image sensor system which is located at a motor vehicle, by the use of at least one calibrating object, the method comprising:

generating, using the at least one image sensor system, image data of the at least one calibrating object;

determining, from generated image data of the at least one calibrating object, an alignment of the at least one image sensor system with respect to a geometric travel axis of the motor vehicle; and determining a calibration using a determined alignment of the at least one image sensor system with respect to the geometric travel axis of the motor vehicle;

wherein:

in the determining of the alignment, at least one pointer is aligned at least one non-steered wheel of the motor vehicle by the at least one pointer, at least one marking point is generated on the at least one calibrating object, and data on the geometric travel axis of the motor vehicle is derivable from the at least one marking point.

8. The method of claim 7, wherein:

a first and a second pointer, each having a pointer beam on a first and a second non-steered wheel of the motor vehicle, are aligned, the first and the second non-steered wheel approximately establish a wheel axis so that the pointer beam of the first pointer is aligned approximately parallel to the roadway plane and approximately parallel to the track of the first non-steered wheel, and the pointer beam of the second pointer is aligned approximately parallel to the roadway plane and approximately parallel to the track of the second non-steered wheel, the pointer beams being suitable in each case for generating a marking point on the at least one calibrating object, the alignment of the calibrating object to the motor vehicle is such that an angle between the geometric travel axis and the calibrating object is between 0° and 180°, for the generation of the image data of the at least one calibrating object by the at least one image sensor system, image data of the marking points is included, and the determining of the alignment of the at least one image sensor system with respect to the geometric travel axis of the motor vehicle is performed with the aid of the generated image data.

9. The method of claim 8, wherein:

the calibration includes determining at least one distance between the at least one calibrating object and at least one of the first and second non-steered wheel along at least one of the first and second pointer beam of at least one of the first and second pointer, and the determining of the alignment of the at least one image sensor system with respect to the geometric travel axis of the motor vehicle is performed with the aid of the generated image data and at least one determined distance.

10. The method of claim 9, wherein in the alignment of the calibrating object to the motor vehicle, the angle between the geometric travel axis and the calibrating object is perpendicular.

11. The method of claim 9, wherein the geometric axis of the vehicle includes at least one of a yaw angle, a pitch angle, and roll angle.

12. The method of claim 8, wherein in the alignment of the calibrating object to the motor vehicle, the angle between the geometric travel axis and the calibrating object is perpendicular.

13. The method of claim 8, wherein the calibrating object has a flat surface.

14. The method of claim 8, wherein the geometric axis of the vehicle includes at least one of a yaw angle, a pitch angle, and a roll angle.

15. The method of claim 7, wherein:

the alignment of a first and a second pointer on a first and a second non-steered wheel of the motor vehicle, the first and the second pointer each having a first and a second pointer beam, the first and the second non-steered wheel approximately establishing a wheel axis so that the first pointer beam of the first pointer is aligned approximately parallel to the roadway plane and approximately parallel to the track of the first non-steered wheel, and the first pointer beam of the second pointer is aligned approximately parallel to the roadway plane and approximately parallel to the track of the second non-steered wheel, the second pointer beams in each case are positioned at an angle different from zero to the first pointer beam of the same pointer, the second pointer beams in each case are aligned approximately parallel to the track of the non-steered wheel, all four pointer beams are suitable in each case for generating one marking point on the at least one calibrating object, the calibrating includes determining a distance between the calibrating object and at least one of the non-steered wheels along the first and the second pointer beams of the first and the second pointer, in the generating of the image data of the at least one calibrating object by the at least one image sensor system, image data of the marking points is included, and the determining of the alignment of the at least one image sensor system with respect to the geometric travel axis of the motor vehicle is performed with the aid of the generated image data and at least one determined distance.

16. The method of claim 15, wherein the geometric axis of the vehicle includes at least one of a yaw angle, a pitch angle, and a roll angle.

17. A device for calibrating at least one image sensor system which is located at a motor vehicle, by the use of at least one calibrating object, the device comprising:
- at least one calibrating object; and
- at least one evaluation arrangement to evaluate image data of the at least one image sensor system, which generates the image data of the at least one calibrating object, and which includes a determining arrangement to determine, from generated image data of the at least one calibrating object, an alignment of the at least one image sensor system with respect to a geometric travel axis of the motor vehicle, the geometric travel axis being a bisector of a total toe-in angle of a rear axis of the vehicle;
- wherein a calibration is determined using a determined alignment of the at least one image sensor system with respect to the geometric travel axis of the motor vehicle.

18. The device of claim 17, wherein the evaluation arrangement includes an arrangement to evaluate data concerning the geometric travel axis of the motor vehicle included in the image data.

19. The device of claim 17, wherein the at least one image sensor system includes at least two image sensor systems which image essentially the same scene.

20. The device of claim 19, wherein the at least two image sensor systems include at least one stereo camera system.

21. A device for calibrating at least one image sensor system which is located at a motor vehicle, by the use of at least one calibrating object, the device comprising:
- at least one calibrating object; and
- at least one evaluation arrangement to evaluate image data of the at least one image sensor system, which generates the image data of the at least one calibrating object, and which includes a determining arrangement to determine, from generated image data of the at least one calibrating object, an alignment of the at least one image sensor system with respect to a geometric travel axis of the motor vehicle;
- wherein a calibration is determined using a determined alignment of the at least one image sensor system with respect to the geometric travel axis of the motor vehicle; and
- wherein at least one pointer is aligned on at least one non-steered wheel of the motor vehicle, and at least one pointer beam of the at least one pointer generates at least one marking point on the at least one calibrating object.

22. The device of claim 21, wherein the at least one pointer includes a range finder.

23. The device of claim 21, wherein the at least one pointer includes an electronic range finder.

24. The device of claim 21, wherein the at least one pointer includes an optical range finder.

25. The device of claim 21, wherein the at least one pointer includes an electronic/optical range finder.

26. An image sensor system including a device for calibrating at least one image sensor system which is located at a motor vehicle, by the use of at least one calibrating object, the image sensor system comprising:
- at least one calibrating object; and
- at least one evaluation arrangement to evaluate image data of the at least one image sensor system, which generates the image data of the at least one calibrating object, and which includes a determining arrangement to determine, from generated image data of the at least one calibrating object, an alignment of the at least one image sensor system with respect to a geometric travel axis of the motor vehicle, the geometric travel axis being a bisector of a total toe-in angle of a rear axis of the vehicle;
- wherein a calibration is determined using a determined alignment of the at least one image sensor system with respect to the geometric travel axis of the motor vehicle.

27. A method for calibrating at least one image sensor system which is located at a motor vehicle, by the use of at least one calibrating object, the method comprising:
- generating, using the at least one image sensor system, image data of the at least one calibrating object;
- determining, from generated image data of the at least one calibrating object, an alignment of the at least one image sensor system with respect to a geometric travel axis of the motor vehicle; and
- determining a calibration using a determined alignment of the at least one image sensor system with respect to the geometric travel axis of the motor vehicle;
- wherein there are at least two image sensor systems which image essentially the same scene, and the alignment of each of the image sensor systems with respect to the geometric travel axis of the motor vehicle is determined separately for each of the image sensor systems, from which the alignment of the image sensor systems to each other is determined;
- wherein the at least two image sensor systems include at least a stereo camera system; and
- wherein the intrinsic calibration data includes at least one of the camera's principal point, the camera's principal distance, at least one distortion parameter, and an influence of a glass pane in a light path of the camera.

28. A method for calibrating at least one image sensor system which is located at a motor vehicle, by the use of at least one calibrating object, the method comprising:
- generating, using the at least one image sensor system, image data of the at least one calibrating object;
- determining, from generated image data of the at least one calibrating object, an alignment of the at least one image sensor system with respect to a geometric travel axis of the motor vehicle; and
- determining a calibration using a determined alignment of the at least one image sensor system with respect to the geometric travel axis of the motor vehicle;
- wherein there are at least two image sensor systems which image essentially the same scene, and the alignment of each of the image sensor systems with respect to the geometric travel axis of the motor vehicle is determined separately for each of the image sensor systems, from which the alignment of the image sensor systems to each other is determined;
- wherein the at least two image sensor systems include at least a stereo camera system; and
- wherein the intrinsic calibration data includes at least one of a principal point, a principal distance, at least one distortion parameter, and an influence of a glass pane in a light path of at least one of the at least two image sensor systems.

* * * * *